Nov. 23, 1954

W. D. FOSTER 2,694,955

FILM MAGAZINE

Filed Aug. 2, 1949

Inventor

Warren Dunham Foster

Nov. 23, 1954 W. D. FOSTER 2,694,955
FILM MAGAZINE
Filed Aug. 2, 1949 5 Sheets-Sheet 2

Inventor
Warren Duncan Foster

Nov. 23, 1954     W. D. FOSTER     2,694,955
FILM MAGAZINE Filed Aug. 2, 1949     5 Sheets-Sheet 3

INVENTOR.

BY Warren Dunham Foster

Nov. 23, 1954　　　W. D. FOSTER　　　2,694,955
FILM MAGAZINE
Filed Aug. 2, 1949　　　　　　　　　　5 Sheets-Sheet 4

Inventor
Warren Dunham Foster

Nov. 23, 1954　　　W. D. FOSTER　　　2,694,955
FILM MAGAZINE

Filed Aug. 2, 1949　　　　　　　5 Sheets-Sheet 5

Inventor

Warren Dunbarn Foster

United States Patent Office 2,694,955
Patented Nov. 23, 1954

2,694,955

FILM MAGAZINE

Warren Dunham Foster, Township of Washington, Bergen County, N. J., assignor to Foster & Foster, Ridgewood, N. J., a partnership Application August 2, 1949, Serial No. 108,122

35 Claims. (Cl. 88—17)

My invention relates to an improved film magazine particularly adapted to house, support, guide and position two films in edge to edge relation to each other. According to this invention I employ two relatively narrow films within a single magazine each of which is separately suspended from an opposite side wall and passes through its own independent gate each with its own aperture, these gates preferably being arranged one adjacent one edge wall and the other adjacent the other edge wall. I provide a separate delivery and a separate take-up support for each film, each of these supports being literally suspended for rotation upon an interior surface of a side wall of a magazine. I preferably divide these films by a readily removable and novel septum preferably constructed out of one piece of thin resilient material which is so designed that it is assembled within the magazine merely by being placed in position and is self-supporting therewithin. Such a septum acts as a guide for each of the adjacent edges of the films. Preferably I construct each gate of a width substantially equal to that of the entire width of the magazine, thus facilitating the insertion of a new film within the magazine, and utilize this septum to guide each film through its respective gate and to limit it to that portion thereof which is opposite the relatively restricted aperture which is suitable for a film of this width. I prefer to utilize gates of a type broadly claimed in the co-pending application of Sigrid Foster and myself, Serial Number 51,888, filed September 30, 1948, patented as Number 2,526,647 upon October 24, 1950, but am not so limited. One object of this invention is to present improvements over such a gate structure.

Although my magazine is particularly designed to accommodate two films each of eight millimeters in width primarily for use in amateur cameras it is not so limited. An important object of this invention is to provide a magazine wherein a film is supported for rotation in one side wall only of a magazine, such support also furnishing driving and braking instrumentalities, the latter preferably being continuously applied.

Large numbers of so called "double eight" magazines and cameras are now in use. These devices employ a single strip of film of sixteen millimeters in width but housed in a magazine and for use with a camera so arranged that a user exposes a longitudinal row of images first on one side of such a strip, then removes the magazine from the camera and turns it over end for end, and exposes another longitudinal track parallel to the first. After exposure such films are generally developed and reversed into positives before they have been slit to separate the two rows of pictures ready for later projection. One of the chief objects of the present invention is to supply a magazine accommodating two single eight films with the exposure apertures and the openings for reception of a pull-down so arranged that the magazine can be used interchangeably in existing cameras, while still conserving the advantages of two independent rolls of films housed within a single outer protective container.

Advantages of using separate films rather than two tracks of images along adjacent portions of the same film are considerable. An important object of this invention is to render possible the enjoyment of such advantages in a manner which is simple, convenient, inexpensive and efficient. The processing of a motion picture negative film, particularly if it is to be reversed into a positive at one operation, for best results requires that the degree of exposure to light in the processing be varied in accordance with the exposure of the original image, in a manner which is well known to practitioners in this art. If there are two sets of parallel images upon the same film it is a practical impossibility, or at least extremely difficult and expensive, to expose during this developing and reversing operation one set of such images to printing light of one intensity as demanded by one particular exposure while subjecting another adjacent and parallel set of images to a printing light of another intensity. Yet if the resulting print is to be of uniform density and thoroughly satisfactory just such separate control of the intensity of a processing light is necessary. Such changes of light intensity are particularly important with color film, which is much more expensive than black and white and presently in much greater demand.

According to my invention while the advantages of the double eight magazine are fully conserved from the standpoint of economy each exposed track or row of images is upon one film and can be properly processed at minimum cost.

It is theoretically possible, as now is occasionally done, to split a double eight film after exposure but before processing. A splitting operation, however, can be carried out economically and accurately only when a large length and width of film is being handled in a production operation. To slit 25 foot lengths of exposed and unprocessed sixteen millimeter motion picture film individually into two strips each eight millimeters wide (those being present commercial dimensions), then to reverse the ends of these films and attach them to each other, all in absolute darkness, and then to process the resulting strip is very much more expensive and troublesome than to handle each eight millimeter film, made such as a part of a large operation, as an individual unit. According to this invention two fresh eight millimeter films can be assembled into this magazine before exposure and removed therefrom after exposure with the expenditure of at least no more time and the requirement of less skill than is necessary in handling one double eight film in a conventional magazine.

For economy and ease of placing fresh films in operation in my magazine I prefer to suspend one film from a body member and the other film from a cover member. After or during such suspension a worker first passes a first film, which is, say, suspended from a body member through its own independent gate. He then slips a septum into position wherein it is held automatically solely by its own construction. He then passes another film, which is suspended from the cover member, through its own gate. Thereupon he places the cover member and the body member together. Preferably the cover member with its film in place has been left flat upon a support and the body member is joined to it, the septum holding the first film in place during this operation. If as I prefer the gate of the said co-pending application is employed the mere act of assembling the cover and body members automatically completes the placing of each film in operative position in its own gate. As broadly claimed in said co-pending application as the two parts of the magazine are brought together, a presser section of the gate being mounted upon one member of the container and a relatively fixed or apertured gate section being mounted upon the other container member, one gate section cams the other out of the way of itself and of the film until the two gate sections have been slipped into position, at which time they merely snap together, the entire operation being practically instantaneous and wholly automatic. To realize the full advantages of this invention I prefer to mount an apertured gate member for each film upon the member of the container from which that film is suspended and to mount the other gate member upon the other member of the container, but I need not do so.

As will have been noted above according to the prior art now a large majority of double eight magazines are inserted in one position for the exposure of one track of the film and then turned over end to end for the exposure of the other and parallel track. Thus the two apertures with their associated openings for the pull-down are disposed in the same edge wall of an outer container. According to this invention, however, I prefer to place each aperture with its associated opening for a pull-down in a different and opposite edge wall of the magazine and to make the inversion from side to side rather than from end to end. By so doing I obtain two substantial advantages. First I am able to enjoy the use of the highly efficient gate of said co-pending parent application with its resulting economies of assembly. Second I am able to produce a magazine which may be used in existing cameras interchangeably with magazines of conventional type. One object of my invention is to produce such a magazine. In so doing I prefer to suspend both delivery coils co-axially but to suspend the two take-up cores anaxially so that their protruding driven pins may be engageable with driving pins of existing cameras after this side to side inversion. Such driving pins of magazine-receiving receptacles which accommodate conventional magazines are off center. This anaxial arrangement makes possible the effective insertion of my magazine in inverted position in conventional cameras.

An important object of this invention is to provide improved constructions of a film containing magazine.

Another highly important object is to provide a septum which divides two films in a magazine, serves as an edge guide, cooperates with each of two gates, and is positioned, supported and held in place by its mere insertion into place, or accomplishes a portion of said results. Such a septum serves as a retainer for each film and as a holding and separating plate.

I describe and illustrate this invention as applied to a magazine for use with a camera, but many of its features may be applied to magazines for use with projectors.

Other objects, advantages and characteristics of this invention will be clear from the above generalized portion of this specification, the detailed description which follows, the subjoined claims and the accompanying drawings. Although I am showing onl preferred forms of my invention for purposes of illustration it will be understood that changes can readily be made without departing from the scope of my broader claims or the spirit of my invention.

In the drawings:

Figures 2 to 9, both inclusive (Sheet 2), are views of a preferred form of suspension device which I employ.

Figures 15, 16 and 17 (Sheet 5) show an alternative form of septum which is more simple than that of Figures 1, 12, 13 and 14.

Figures 18, 19 and 20 (Sheet 4) show improved means by which an end of a film may be attached to its support or spool.

Figure 6:
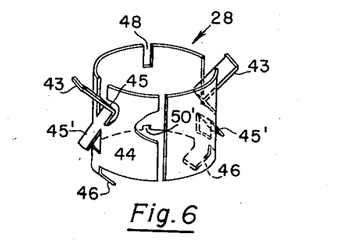
Figure 6 is an isometric drawing partly broken away of the spring member which forms one of the two bearing surfaces of this phase of this construction.
Figure 7:
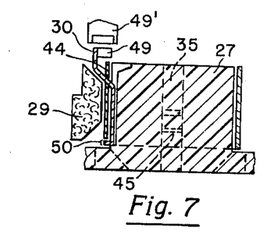
Figure 7 is a fragmentary view corresponding to Figure 2 but taken at an angle of ninety degrees thereto.

For clarity and simplicity certain terminology is used uniformly in the following specification and in the subjoined claims. The "front" of a magazine or a part thereof is that portion thereof which is disposed toward a lens of a camera or other film handling apparatus when the magazine is in use. "Side" walls are the parallel broad and flat walls of a protective container of a magazine, while "edge" walls are the narrow walls connecting the side walls and holding them in spaced parallelism and completing the enclosure of a container. "Top" (or "upper") as applied to an edge wall is that portion which is uppermost and horizontal when the camera and magazine are held in usual picture taking position. As applied to a side wall it is the wall more distant from the drive and closer to the cover in usual constructions. "Bottom" (or "lower") as applied to a side wall is that side wall which is closer to a drive when the magazine is in its receptacle in a camera of usual construction. In describing a magazine gate the orientation of side walls is employed. As applied to an edge wall "bottom" is the one which is lower when a picture is being taken or projected with the apparatus in its usual position. The orientation of a film is in accordance with the above terms. Thus a "front side" of a film is that which is nearer a front edge wall and the lens and an upper edge is that nearer an upper side wall. Like terms are similarly employed. "Inner" and "outer" and similar words as applied to film supports, as for example in the description of Figure 6, are to be taken from the point of view of that structure alone, its axis of rotation representing its "inner" extremity. A "gate" is a combination of guides which in its area of exposure maintains the film centered and in the focal plane of the lens with which the film is being used. It consists of a forward or apertured plate, which determines the focal plane, and a rear or presser plate which resiliently holds a moving film in this plane. A "septum" is a partition or metal or plastic membrane which divides the two films and their compartments and does not carry a load or support moving parts journalled therein.

As has been made clear in the introductory portion of this specification my film-containing magazine includes essentially an outer protective container, a gate and associated members cooperating with invidiual apertures for each of the two films which are employed, means for separating said two films, shown in the form of novel, multi-purposed septa, and supports by which each film is suspended from its member of the container. A unique characteristic of this invention is that one film is completely supported by and suspended from one member of the container and the other film is completely supported by the other member thereof. According to the said co-pending application now Patent Number 2,526,657, which I prefer to employ, a first or apertured gate section for each film is supported upon that member of the container from which that film is suspended. The other or presser gate section for each film is suspended from the other member of the container. Each film is first threaded into its own apertured gate section. Then the containers are placed together, the films preferably having been separated by my novel septum. The mere operation of placing cover and body members of the container together is effective to complete the assembly of each gate, each presser member first being automatically cammed away from the film and then snapped into running position as the assembly is completed. A separate aperture is, of course, associated with each gate. Other gates may be used if desired but I have found the structure mentioned above peculiarly applicable to a magazine wherein two films are separately suspended.

Figure 10:
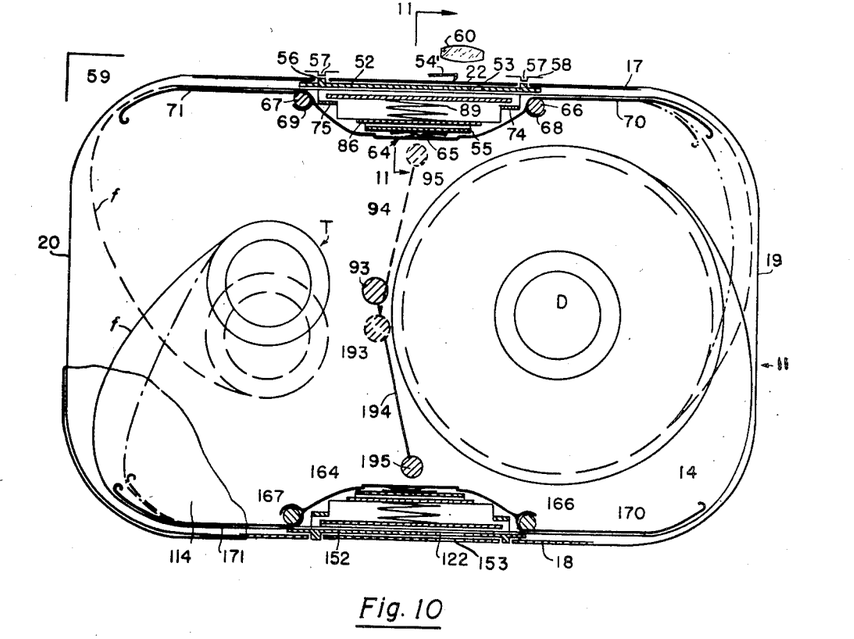
Figure 10 (Sheet 3) is a top plan view of a magazine embodying my invention, partly broken away and partly in section.

My container consists broadly of a body member 11, a cover member 12 and a removable septum 13. The body member may consist of a floor 14, an upstanding first front edge wall 17, an upstanding second front edge wall 18 and end edge walls 19 and 20. Each of these first mentioned edge walls is designated as "front" because it alternatively is placed in picture taking position and cooperates with the same lens of a camera. First front edge wall 17 includes an aperture 22 (Figures 10 and 11) which cooperates with a gate associated with this first front edge wall for accommodating a first film which is suspended from wall 14 of the body member 11. In Figure 10 this first film when inoperative is shown in dash line and when operative in dash and double dot line. As previously stated each of the two films is separately suspended, one (identified for convenience as the first) by the body member and the other (for convenience called the second) by the cover member of the container and each has its own gate and aperture. Since these parts are duplicates only one will be described and the same reference characters with 100 added will be applied to the other. The second film when inoperative is shown in solid line and when operative in dash and single dot line.

The novel suspension device of which I make use now will be described.

Figure 2:
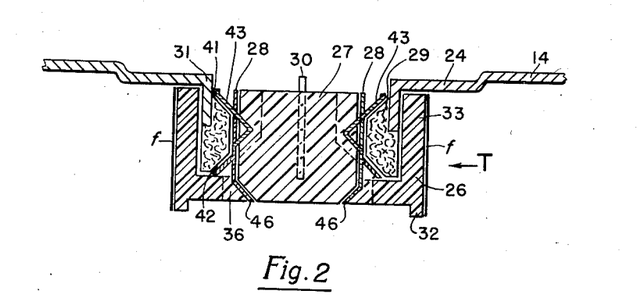
Figure 2 is a vertical section through the middle of a take-up support.
Figure 3:
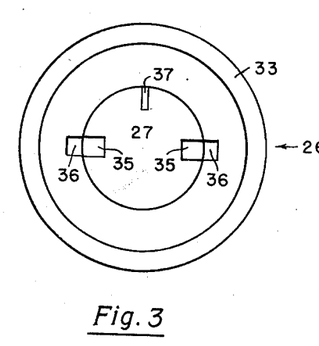
Figure 3 is a top plan view of the subject matter of Figure 2, the plastic symbol being omitted for clarity.
Figure 4:
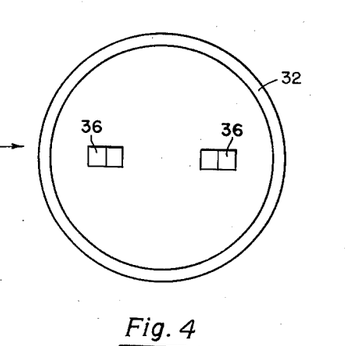
Figure 4 is a bottom plan view of the subject matter of Figure 2, the plastic symbol being omitted for clarity.
Figure 11:
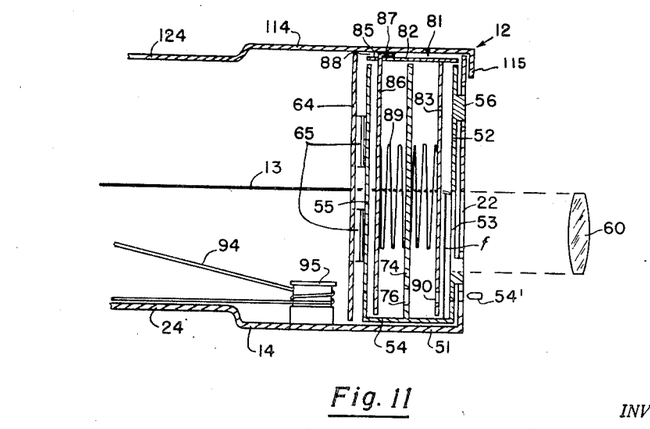
Figure 11 is a partial section taken on the line of 11—11 of Figure 10 and looking in the direction of the arrows, with a cover member of the magazine shown in position.
Figure 12:
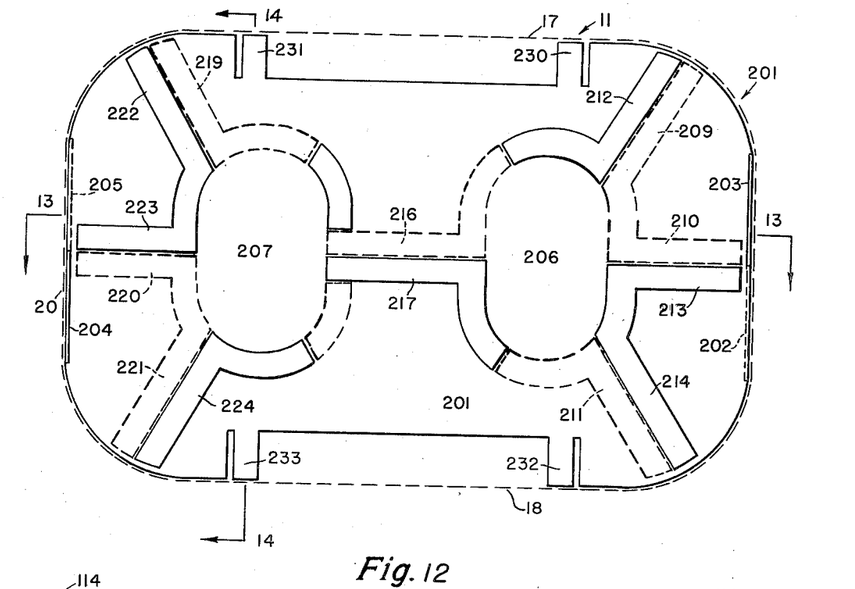
Figure 12 (Sheet 4) is a top plan view of a septum which can be used in the practice of this invention.
Figure 13:
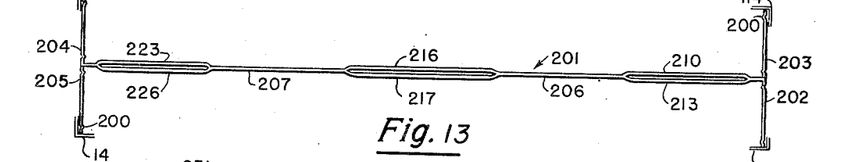
Figure 13 is a section taken on the line 13—13 of Figure 12 and looking in the direction of the arrows, certain parts being omitted.
Figure 14:
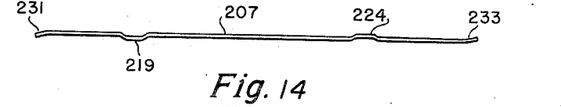
Figure 14 is a section taken on the line 14—14 of Figure 12 and looking in the direction of the arrows, certain parts being omitted.

As will be clearly seen from Figures 2 and 11 side wall member 14 which forms the floor of the body member may embody a slight inward depression 24 to furnish a suspension platform from which there revolves a first take-up support for the first film generally indicated as T. A second take-up support T' for the second film is exactly the same in construction as this first take-up support and is not described in detail. The two delivery supports D and D' are also identic except that they lack driving pin 30 and the openings necessary for its reception. As noted above in connection with the container members the elements associated with the second film bear the same reference characters as those associated the first film with one hundred added. Thus for example the depression associated with the first film is designated as 24 and that for the second as 124. For convenience of presentation the point of view in Figures 2 and 11 and those associated therewith is diametrically opposite. That is to say, the floor 14 of Figure 11 appears at the top of Figure 2.

Figure 5:
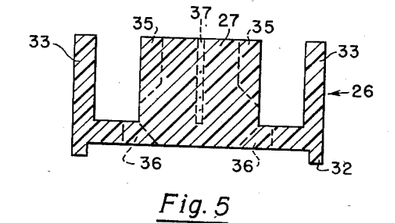
Figure 5 is sectional view corresponding to Figure 2 but showing only the support upon which a film is directly wound.

This take-up support T consists essentially of a spool 26 which directly supports the film f, shown alone in Figure 5, a central driving body 27 integral with the spool, a multi-purposed bearing, driving and retaining spring 28, an oilite or other similar self-lubricating annular insert 29, and a driving pin 30. Bearing insert 29 is attached fixedly to a light trapping annulus 31 which is turned inwardly. As will be best seen from Figure 5, as well as from Figures 2, 3, 4 and 7, the film spool or direct support 26 is irregularly formed of a single piece preferably of a synthetic resin.

This piece terminates (as viewed at the lower portion of Figures 2 and 5) in an annulus or rim 32 which occasionally and briefly may rest upon bearing supports 207 or 319 of the septa respectively, to minimize frictional contact. As a matter of practice, this contact is very slight and generally and preferably does not exist at all because support is by suspension in the side walls. Since users often mistreat magazines and cause slight indentations the provision of this narrow annulus is a wise precaution. Moreover, this construction is useful when a manufacturer does not employ complete suspension.

Upstanding walls 33 of this spool are disposed closely adjacent the interior surfaces of light-trapping annulus 31 and the oilite bearing so that there is no light leakage. A film is wound upon the external surface of these walls. Its end may be attached in any desired or conventional manner or as described in connection with Figures 18, 19 and 20 hereof as claimed in the said co-pending application of Binneveld et al. Central upstanding driving body 27 receives the multi-purposed spring 28 and driving pin 30. Openings 35 and 36 cast in this central block receive portions of opening 37 and accommodates driving pin 30.

The self-lubricating bearing 29 which is firmly attached to light trap 31 is formed with upper and lower diagonally inclined shoulders 41 and 42 respectively which likewise cooperate with the multi-purposed spring just mentioned.

The construction of multi-purposed spring 28 will be clear from Figure 6, which shows it alone. This spring is made in one piece formed into a circle but so that the vertical edges do not quite meet when it is placed in position thus making its resilience effective. Along its upper edge outward holding sections 43 are cut from the main upright body 44 and bent away from the axis of rotation while other driving portions 45 of the same member triangular in vertical cross section extend inwardly. Outwardly extending sections 43 bear against upper inclined surfaces 41 of the self lubricating bearing and lower out-turned sections 45' bear against its lower inclined surfaces 42. Thus as pin 30 moves this support as later described (or the traction of the film if the support is for a delivery coil) the surfaces which rotationally engage a fixed portion of the magazine are holding sections 43 of the steel spring and, if desired, the surface 44 of the body of the spring between these driving portions. Thus contact is of steel upon a self-lubricating bearing which minimizes friction and permits this particular suspension device to be utilized advantageously in this combination. Friction between the multi-purposed spring and its support can readily be increased to whatever point is desired in order to prevent unwanted unwinding of either mass of a film when no feeding operation is going on and to cooperate as desired with the resilience of the compensating tensioning arms associated with each gate, according to the Bundick and Proctor system later identified. It is to be noted that the application of whatever degree of friction is desired, whether before or during operation, is entirely uniform.

Spool and the multi-purposed spring are held together to revolve as a unit by contact between the side edges of triangular driving portion 45 and the sides of openings 35. Also tabs 46 extend downwardly and inwardly from the body of spring 28 to engage the upper inclined surfaces of openings 36 previously described thus holding the spring in firm engagement with the spool so that both revolve as a unit.

Figures 8, 9:
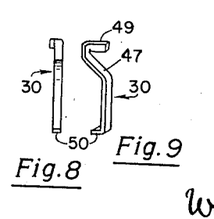
Figure 8 is a side elevation of a driving element.
Figure 9 is an isometric view corresponding to Figure 8 but rotated ninety degrees.

The construction of driven pin 30 will be clear from Figures 8 and 9. This pin is formed with a portion 47 bent away from the main body portion and passing through notch 48 of the spring 28 when assembled therewith. The outer end of this pin terminates in an off-set portion 49 which is engaged by and driven by a driving pin 49' (Figure 7) which is disposed within the magazine-receiving compartment in a camera or other apparatus with which my magazine is to be used. The opposite or inner end of this pin consists of an off set portion 50 which is engaged by a notch 50' formed in the inner edge of spring 28.

Thus driven pin 39 is held firmly at both the upper and lower edges of spring 28. Alternatively, an upstanding projection may be formed in multi-purposed spring 28 which takes the place of offset portion 49 of spring 30.

The assembly of this suspension device will be evident from the above portion of this specification and sheet 2 of the drawings. The first step is to place pin 30 in notch 37. The second is the insertion of spring 28 in the space between walls 33 and central driving portion 27 of spool 26. As the spring slips into place out-turned end 50 passes into opening 50' and shoulder 47 into notch 48. Alternatively, the spring may first be placed into position and the pin then inserted between it and driving body 27, the resilience of the spring easily making such movement possible. Spring tabs 46 have sufficient resilience so that after they have been sprung back as the spring 28 is forced downward they find their way into openings 36. Driving portions 45 slip within openings 35, with their edges bearing against the sides of the openings thereby furnishing driving contact but with clearance between their points and the walls of these openings relatively adjacent the axis to allow for the movement necessary for assembly and dis-assembly. This operation is carried out at a factory wherein the spools are made. When a film manufacturer or distributor wishes to place a film in position he merely pushes the spool onto bearing 29. Tabs 43 are cammed backwardly into openings 35 until they have passed the inwardly protruding portions of the bearing. Then they engage the adjacent surfaces of the bearing while tabs 45' engage the oppositely disposed surfaces, thus establishing a bearing contact. To remove a spool, a worker merely pulls it away from the adjacent side wall in a direction normal thereto. Tabs 43 are cammed inwardly as they pass over the hump of the bearing.

If the spool is for delivery coil, a film f is wound about the spool. If the spool is for a take-up coil, the free end is attached after the delivery coil has been placed upon a delivery spool. The ends of the film may be attached before or after the spools are mounted. In any case an end may be attached to its spool in any desired or conventional way or preferably in the novel manner illustrated in Figures 18, 19 and 20 and described in connection therewith.

The take-up spools, after the magazine has been placed in a camera and the mechanism started, are driven by contact between members 49 and 49'. The friction between magazine and spool is entirely that of the steel tabs 43 and 44' and the upright steel shell 44 on the oilite bearing. Delivery reels are similarly revolved, but by the traction of the film.

Intermediate the two spools D anl T and D' and T', respectively, each of the individual films passes through its own gate.

A preferred characteristic of the gate employed for this magazine is that its height is substantially equal to the combined widths of the two film strips, plus that of a septum which is very thin. I also prefer to use a gate which per se is described and claimed in the said co-pending application now Patent Number 2,526,647, but any other desired and satisfactory construction may be employed. In such preferred construction, one member or section of the gate is mounted upon one container member and the other gate section the other container member, the mere act of the assembly of the container being effective to put both gates into running condition. The first or apertured section of each such gate is in the form of a square-cornered letter U. It should be understood, however, that no matter what gate is used the cross bar of its film receiving portion, or whatever portion is adjacent the outer edge of each film, is preferably disposed adjacent a different side wall of the magazine. That is to say an edge of the film in each instance runs relatively close to a side wall and consequently each gate in its film receiving and film guiding portion must also be close to that wall as well as having its front and apertured upright wall adjacent and parallel to the adjoining edge wall, with the side of the film likewise parallel and adjacent thereto.

A front or apertured U-shaped gate member or section generally indicated as 51 has a front upright leg 52 which comprises its film contacting and guiding portion and contains an aperture 53 of suitable configuration to serve as a window for the picture, and to receive a claw 54' of a film handling apparatus. Alternatively and as shown in Figure 11, a separate claw receiving slot may be provided. The cross bar of the U is a lower right angled section 54 of the same plate which extends backwardly adjacent and parallel to the floor 14 of the body portion of the magazine and preferably in contact therewith. Separation of parts is exaggerated for clarity, notably in Figures 10 and 11. The back upright or leg 55 is a wall which extends upwardly at right angles to the intermediate portion or cross bar 54 and parallel to the front portion 52. Pins 56 which will be clearly seen in Figure 11 extend forwardly through edge wall 17 to engage positioning studs 57 which extend backwardly from a wall 58 of a magazine receiving receptacle 59 of an apparatus with which the magazine is used and establish the plane of gate plate 52 in the focal plane of lens 60. See Figure 10.

Figure 1:
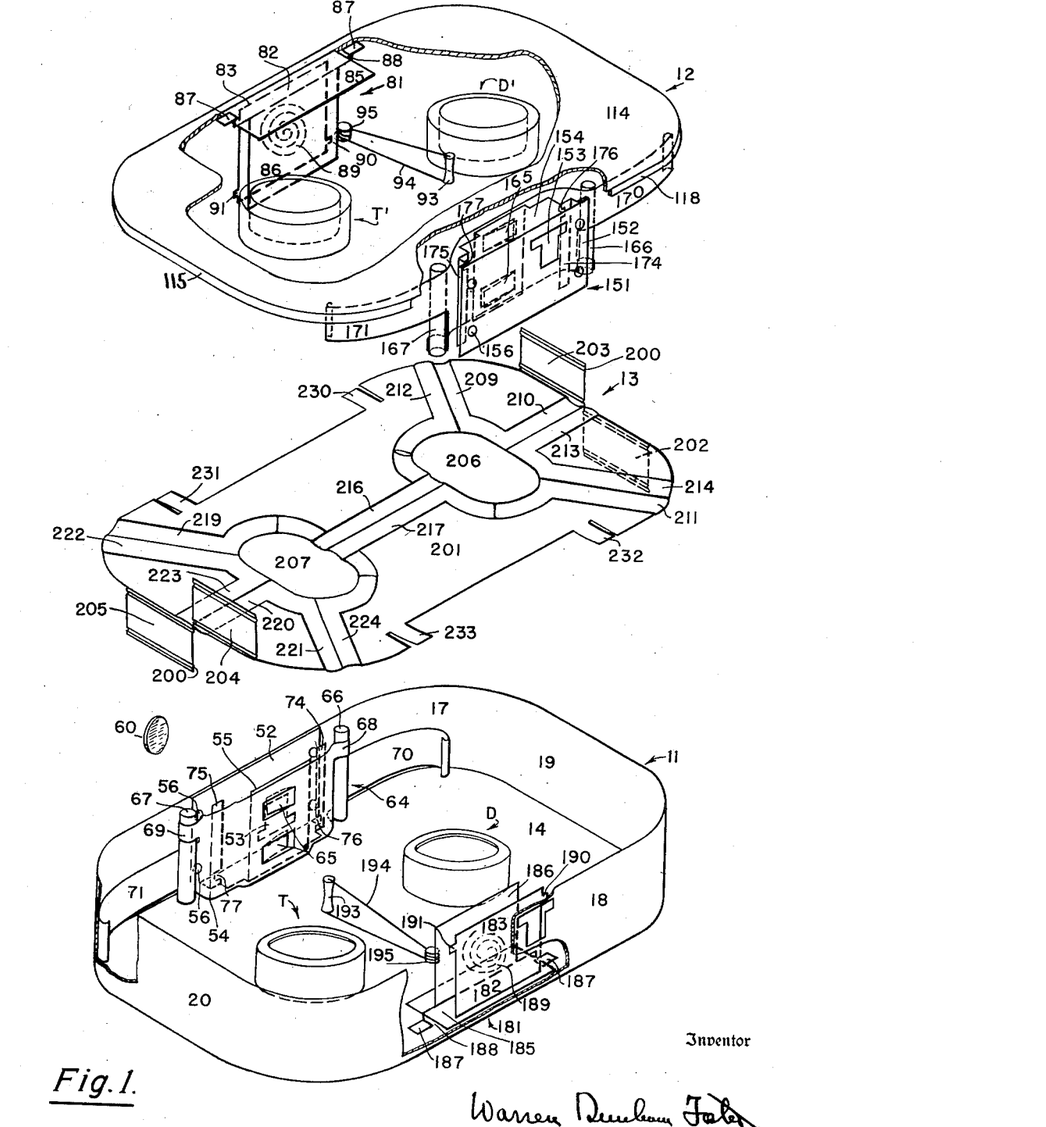
Figure 1 is an exploded isometric showing of a magazine embodying this invention partly broken away and with certain parts, notably in connection with the suspended film supports, having been omitted for clarity.

In order to press this gate structure forwardly toward the lens a multi-purposed spring generally indicated as 64 is provided. A central portion of this spring is formed with two forwardly extending cut out portions 65 which engage the rearward surface of supporting or back leg 55 of the U of this forward gate section. This spring in turn is supported by posts 66 and 67 attached to floor 14 of the body member of the container. At these points this spring is cut along a center line, horizontally as viewed in Figure 1, with portions 68 and 69 bent backwardly about these posts respectively and the remainder 70 and 71 extended along the film track to form Morsbach guiding and compensating channels in the well known manner taught by that inventor as in his United States Patents Numbers 2,159,998 and 2,175,538 issued respectively May 30, 1939, and October 10, 1939. By reason of this construction a delivery channel leading from delivery member D or D' to the delivery end of the gate is formed and a corresponding take-up channel leading from the take-up gate toward take-up member T or T', the ends of these channels adjacent the film rolls being resilient and furnishing compensation in the manner taught by Bundick and Proctor in their Patent 1,944,022, dated January 16, 1934, and as applied to a magazine in my Patent 1,975,782 dated October 9, 1934.

As is described and claimed in said co-pending application now Patent Number 2,526,647 simple devices are installed to provide an easy method of assembly. The intermediate section or cross bar of the U-shaped forward gate section is extended upwardly at 74 and 75 to form two flat guiding posts with notches cut in the bottom portion of which only one 76 is shown, the other being similar. These posts are parallel to the upright legs 52 and 55 of the U-shaped gate member but spaced therefrom laterally as well as horizontally. As will later be described and as is claimed in said co-pending application per se these guiding posts cam the presser structure of this gate away from the film as the two container members are put together after a fresh film has been placed in position thus making the assembly operation quick, easy and automatic.

A corresponding fixed or forward or apertured gate section 151 which in every particular may be exactly the same as just described is mounted upon the floor or other flat side 114 of cover member 12 and depends therefrom. The various parts of this gate may be exactly the same as just described, including also the tensioning members 170 and 171. All such duplicate parts which are identified in the drawings bear the same reference characters as have just been applied to the gate for the first film with the digit 1 introduced prior to the two digits of the preceding discussion. Therefore, for example, the upright leg of the U of the second gate is known as 152 with an aperture 153 while those of the gate just described are characterized as 52 and 53 respectively.

A simple presser gate member or section generally indicated as 81 is suspended from flat side 114, with a rim 115. It comprises a T-shaped member 82 having a perpendicular leg or film engaging portion 83 which depends from a cross bar 85 which is disposed parallel to and adjacent the inner flat surface 114 of cover member 12. A supporting plate 86, attached as by spot welding at tabs 87 to the bottom surface of side wall 114, extends therefrom. Adjacent said wall an opening 88 is formed through which cross bar 85 of the gate plate 81 is passed. Thus the upper edge of this opening and the lower surface of side 114 act as a guide for the cross bar 85 of the T. A coiled or other spring 89 extends between plate 86 and plate 83 in order to give necessary resilience to the latter. Extensions or ears 90 and 91 (Figure 1) laterally extending from the lower portion of the leg or film engaging portion of this T formation cooperate with posts 74 and 75 and notches 76 and 77 in a manner later to be described.

A second presser gate structure for the second gate similar to that which has just been described is mounted in upstanding relation to floor 14 of body 11 adjacent the second front edge wall or flange 18 of the body member of this magazine. The description will not be repeated since the parts may be exactly the same as those just described. As previously stated in connection with the forward or apertured gate member this gate section bears the same reference characters as previously with the digit 1 added therebefore. Thus the film engaging plate of the T-shaped principal member of this assembly is characterized as 182 instead of 82.

A coil-dividing roller 93, suitably relieved, is attached as by a spring wire 94 to a rivet 95 in floor 14 of the body member of the magazine. The purpose of this roller is to keep the two masses of the film apart. Also, if desired, it may be positioned to be effective to transmit power from the driven take-up mass to the idling delivery mass and also to reverse the direction of movement.

A similar coil divider 193-4-5 is provided for the other length of film.

A removable septum or dividing membrane or wall, which is self-aligning and self-supporting, forms an important portion of this invention, as will be fully understood from Figures 1 and 12, 13 and 14. For an alternative form see Figures 15, 16 and 17 and the description thereof which follows. This septum is composed of a very thin sheet of stiff and resilient sheet metal. It divides the first and second lengths of film, may furnish proper platforms for each, establishes the necessary edge guides, prevents scratching of the image bearing portion of each film, and renders almost instantaneous the assembly of the two lengths of film within their container.

This septum as first shown consists essentially of a generally flat surface 201, which forms a body portion, and right angled supporting portions or tabs turned therefrom. Tabs 202 and 203 extend therefrom, one in one direction and one in the other, on the delivery side, and corresponding tabs 204 and 205 are similarly disposed on the take-up side. It will be noted that the ends of these tabs bear against the side walls of the container and their side surfaces against the edge walls, thus making the septum self-aligning and self-supporting within the container. An important additional feature of these tabs is the relief which is furnished to keep the emulsion from rubbing against the sides of the container. As shown, inwardly extending grooves 200 engage the edges of the film to hold the intermediate and critical image-bearing portion away from contact with edge walls. A delivery platform 206 serves to separate the delivery portions of the film and a take-up platform 207 furnishes the same function for the two off set take-up masses. In preferred forms of my invention these formations do not actually support the films since they are completely suspended by the top and bottom side walls of the container.

Throughout the major portion of the length of the septum guiding indentations and projections are formed side by side, those extending in one direction serving as an edge guide for a first film and those extending in the other direction serving as an edge guide for a second film. Thus those that extend downwardly toward the bottom wall 14 of the body member guide the first film and those which extend upwardly toward the top wall 114 of the cover member guide the second film, assuming that the magazine is completely assembled in operative position. Downwardly extending guides 209, 210 and 211 radiate from the delivery platform to the adjacent edges of the septum, the two first mentioned being joined and the latter extending around the rightward edge of the platform as viewed in Figures 1, 12 and 13. Similar upwardly extending guides 212, 213 and 214 are provided for cooperation with the second film. The delivery and take-up platforms are joined by guides 216 and 217, each with an arm extending part of the way around each of the platforms, 216 being downturned and 217 being upturned. Similar guides radiate from the take-up platform, 219, 220 and 221 being down-turned and 222, 223 and 224 being upturned, these formations duplicating those previously described for the delivery platform.

Edge guides associated with each gate form an important feature of this phase of my invention. Guides 230 and 231 extend from the body of the septum and are turned slightly downwardly from the body of the septum to engage the inner edge of the first film on each side of the gate and hold it in proper relation thereto as it passes through. Similar guides 232 and 233, extending from the opposite edge of the septum, perform a similar function for the second film at each end of its gate. It should be remembered that the metal from which this septum is formed is resilient as well as very thin.

Figure 15:
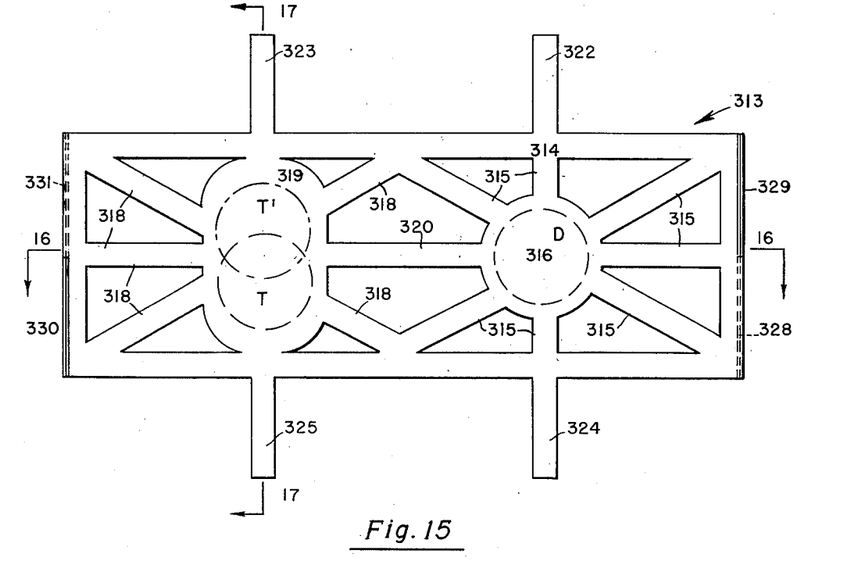
Figure 15 is a top plan view of such a septum generally corresponding to Figure 12.
Figure 16:
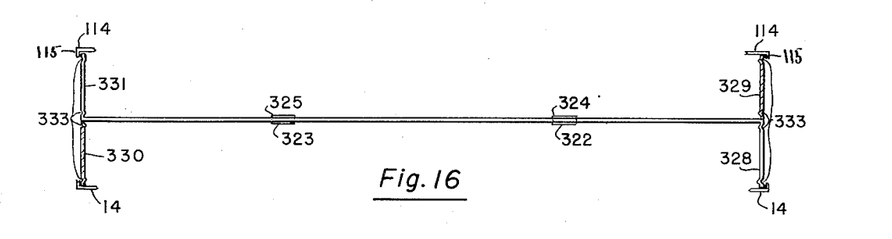
Figure 16 is a section taken along the line 16—16 of Figure 15 and looking in the direction of the arrows.
Figure 17:
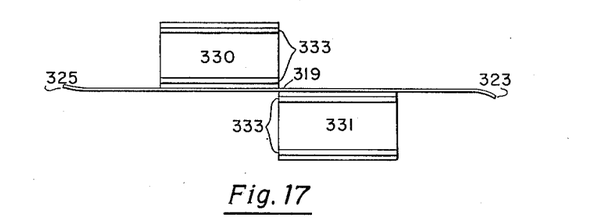
Figure 17 is a section taken along the line 17—17 of Figure 15 and looking in the direction of the arrows.

Figures 15, 16 and 17 present a simplified septum, made from a single piece of thin and resilient metal, generally indicated as 313 in the form of a skeletonized plate having a generally rectangular outside frame 314 which by a plurality of straps 315 supports a platform 316 adjacent a delivery mass D. Similar straps 318 are extended from the frame to take-up platform 319, which because of the necessity of accommodating take-up masses T and T' which are off-set from each other are wider and joined to the frame. The platforms are joined by another strap 320. Edge guides 322 and 323 extend away from this frame and are bent slightly downwardly. These form edge guides are similar respectively to guides 230, 231, 232 and 233, previously described in connection with septum 13 of Figures 1 and 12, 13 and 14. Guides 322 and 323 hold the upper edge of the lower film in place as it passes through gate 81 and guides 324 and 325 perform the same task for the upper film as it passes its gate. It will also be understood that the broad surfaces of the frame and straps of the septum guide the edges of the two films as well as separating them.

At the delivery edge of the septum two right angled supporting extensions or tabs 328 and 329 are turned therefrom, one in one direction and the other in the other, and corresponding tabs 330 and 331 are similarly disposed on the take-up side. Extensions 329 and 331 engage the inside surface of cover or side wall 114 and edge wall 19 and extensions 328 and 330 engage such surface of bottom or side wall 14 and edge wall 20, thus holding the septum firmly in place as well as automatically aligning it as it is dropped into position. These tabs are formed with inwardly extending grooves 333 which hold the central image bearing position of the film away from the edge walls of the magazine.

Figure 18:
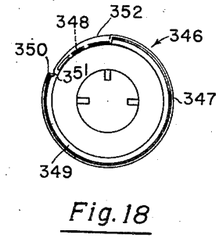
Figure 18 is a top plan view of one such support with an attaching spring cast as a part thereof.
Figure 19:
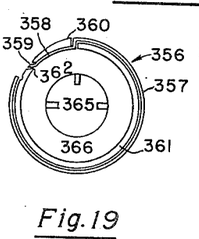
Figure 19 is a top plan view of another such support with an attaching spring assembled therewith by merely being dropped into place.
Figure 20:
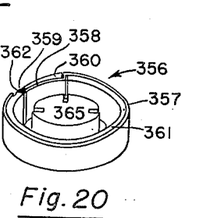
Figure 20 is an isometric view which corresponds to Figure 19.

As previously stated the ends of each film may be attached to its support in any desired or conventional manner. In Figures 18, 19 and 20, however, improved means for accomplishing this end in a minimum of time and with no trouble and little danger of torn finger nails are shown. Since generally this operation must be performed in the dark, a simplified device is most useful. This attaching means is claimed in said previously mentioned copending application of Binneveld et al.

As illustrated in Figure 18, an outer film spool 346 may correspond to spool 26 except for improved means for holding a film in place which are about to be described. An attaching slip-spring 347 is provided which forms an almost complete circle, but off-set at 348. As the spool is being cast from a synthetic resin this spring is inserted in the position shown in Figure 18, with the offset portion disposed within edge wall 349 and the remaining portion encircling the remaining periphery of the wall to the extent of about 300°. The position of the wall opposite the tip 350 of the spring where the film is attached is formed with a slight notch 351 which makes easier the insertion of an end of a film. The surface of that portion of the outer surface of the wall opposite the encast end of the spring is inclined outwardly from the notch at 352 thus making insertion easier, avoiding a small but sharp bend of the film, and providing a greater width of material to hold the encast end of the spring in place.

The structure shown in Figures 19 and 20 is similar. A similar spool 356 is provided with a somewhat similar spring 357 which is dropped into place instead of being so cast. This spring includes an offset portion 358 and a terminal holding lip 359, the former fitting into a channel 360 cut through outer wall 361 of the spool and the latter dropping into channel 362. Thus the spring in the original assembly is merely dropped into place and firmly held there by its own tension. The portion of the holding spring 357 which fits between wall 361 and the central upstanding portion 365 of the spool is made slightly narrower than the outer portion because of the bottom wall 366 of the spool.

The assembly of our device for the insertion of a fresh film will have been made clear from the drawings. It may be summarized as follows: Assume the required amount of film to have been rolled about delivery supports D and D'. A worker in a plant of the film manufacturer or distributor thereupon places a cover member 12 upside down and places a body member right side up upon a table. Thereupon he pushes the two delivery members into place in the manner previously described. He reels off the few inches of film necessary to pass through the gate of the one body member with a surplus for attachment of the leading end, places it in the gate and pushes the leading end of the film underneath the spring 350 or 357 depending upon which attaching means is used. He does the same for the other member. Alternatively the leading end of each film may be placed in the take-up supports T and T' respectively and each film supported at each end then slipped into its gate as the supports are slipped into place. Thereupon he places a septum in position over the cover member with the extensions 329 or 331 or 203 or 204 engaging the turned over rim or flange 115 of the side 114 of the cover member. He then has the septum in position over the cover member. Then he places this element so assembled in position over the body member. The extensions 328 and 330 (or 202 and 205) of the septum thereupon engage the side walls 19 and 20 respectively of the cover member. This act in itself assembles the two gates. The positioning posts cam the presser gate plates away from the fixed gate plates and the film until the two plates are in substantially their ultimate relation to each other. Then they snap into place. This element including the cover member may be slightly tilted to make engagement with one set of posts easier and the presser plate on the other side moved inwardly by a finger or tool, or both sets of posts may be tilted slightly inwardly. At this time the cover is in protective position over the body member and assembly is complete. Alternatively the septum may be placed within the body member and that member then turned over and placed upon the cover member.

The advantages of my invention will have been made clear from the foregoing portion of this specification and from the attached drawings. They include the provision of a simple, efficient, inexpensive and almost completely automatically assembled film containing magazine adapted to support two different films in edge to edge relation, each being adapted for successive use following a side to side inversion of the magazine. They also include suspension of one film upon one member or one side wall of a magazine and the suspension or support of another film upon another member or side wall, a removable septum being provided therebetween. The advantages also include the provision of a separate gate for each film, preferably disposed in different and opposite sides of a magazine, and co-axial relation for the two delivery supports and anaxial relation for the two take-up supports. Also among these advantages is provision of a removable and self-supporting and self-positioning septum to separate two films mounted independently of each other in the same container, such septum greatly simplifying the insertion of a fresh film.

I claim:

1. In an interchangeable film magazine for successive use in a plurality of different film handling apparatus, said magazine having side walls held in spaced parallelism by edge walls, means for supporting two films in edge to edge relation to each other within the magazine, said means including two separate delivery supports and two separate take-up supports, a suspension mount for one of said delivery supports, a suspension mount for one of said take-up supports, said suspension mounts being disposed in one of said side walls of said container and extending from the inside surface thereof, a first of said films passing from said delivery support to said take-up support, a suspension mount for the other of said delivery supports, a suspension mount for the other of said take-up supports, said second mentioned suspension mount being disposed in the other and opposite of said walls and extending from the inside surface thereof toward said other suspension mount, the second of said films passing from said second mentioned delivery support to said take-up support, each of said supports and the suspension mount thereof being independent of each of said other supports and the suspension mount thereof, said side walls being separable from each other, and each of said supports being mounted upon the inside surface of its respective side wall for support thereby and revolution thereon irrespective of the position of said side wall, and a guiding member disposable in said magazine independently of said supports for holding one of said films in position while said separable side walls and the films suspended therefrom are being assembled and for separating each of said films from the other thereof after such assembly.

2. In an interchangeable film magazine for successive use in a plurality of different film handling apparatus, said magazine having an outer protective container, said container having a cover member and a body member, a delivery support and a take-up support for a first film, a mount for suspending each of said supports upon said body member for rotation relative thereto and bodily movement therewith, a delivery support and a take-up support for a second film, a mount for suspending each of said last mentioned supports upon said side wall of said cover member for rotation upon the axis normal thereto and bodily movement therewith, all of said mounts being entirely independent of each other, the placing of said cover member upon said body member being effective to dispose said two films within said container in edge to edge relation to each other, a separate aperture in said body member for each of said films, a guide upon each of said members for directing the film disposed thereupon past its aperture, and a guide upon said body member for initially positioning the film disposed upon said cover member into position opposite said aperture therefor as said members are assembled after each of said films has been placed on its support.

3. In an interchangeable film magazine for successive use in a plurality of different apparatus, said magazine having an outer protective container, said container comprising a cover member and a body member, a delivery support and a take-up support for a first film, said supports being disposed upon said body member for rotation relative thereto and bodily movement therewith, said container when said cover member is assembled with said body member having a first side wall held in spaced parallelism to a second side wall by edge walls, a first and second of said edge walls being disposed opposite each other and each embodying an aperture, said first supports being disposed upon said first side wall, the width of said edge walls being substantially twice the width of said first film, a removable septum, means for detachably mounting said septum adjacent the edge of said first film after said first film has been disposed upon said side wall, a second delivery support and a second take-up support for a second film, said second supports being mounted upon said second side wall for rotation upon an axis normal thereto and bodily movable therewith, and guides for directing each of said films past one of said apertures respectively, whereby said first film may be positioned upon said first side wall and said member embodying said first side wall after said septum has been assembled therewith may be disposed in operative relation to said other member, said first film being maintained in position by said septum and said septum after such assembly separating said first and second films.

4. An interchangeable film magazine for successive use in a plurality of different apparatus, said magazine having an outer protective container, said container comprising a cover member and a body member, a delivery support and a take-up support for a first film, said supports being disposed upon said body member for rotation relative thereto and bodily movement therewith, said container when said cover member is assembled with said body member having a first side wall held in spaced parallelism to a second side wall by edge walls, a first and second of said edge walls being disposed opposite to each other and each embodying an aperture, said first supports being disposed upon said first side wall, the width of said edge walls being substantially twice the width of said first film, a removable septum, means for detachably mounting said septum adjacent the edge of said first film after said first film has been disposed upon said side wall, a second delivery support and a second take-up support for a second film, said second supports being mounted upon said second side wall for rotation upon an axis normal thereto and bodily movable therewith, and gates for directing each of said films past one of said apertures respectively, each of said gates being substantially the width of said edge wall adjacent which it is positioned and said septum embodying projections which limit each of said films to one half of each of said gates respectively in line with its aperture whereby said first film may be positioned upon first side wall and said member embodying said first side wall after said septum has been assembled therewith may be disposed in operative relation to said other member, said first film being maintained in position by said septum and said septum after such assembly separating said first and second films.

5. An interchangeable film magazine for successive use in a plurality of different apparatus, said magazine having an outer protective container, said container comprising a cover member and a body member, a delivery support and a take-up support for a first film, said supports being disposed upon said body member for rotation relative thereto and bodily movement therewith, said container when said cover member is assembled with said body member having a first side wall held in spaced parallelism to a second side wall by edge walls, a first and second of said edge walls being disposed opposite to each other and each embodying an aperture, said first supports being disposed upon said first side wall, the width of said edge walls being substantially twice the width of said first film, a removable septum, said septum embodying a resilient extension engageable with the interior of said member upon which said first film has been mounted for holding said septum therewithin for deachably mounting said septum adjacent the edge of said first film after said first film has been disposed upon said side wall, a second delivery support and a second take-up support for a second film, said second supports being mounted upon said second side wall for rotation upon an axis normal thereto and bodily movable therewith, gates for directing each of said films past one of said apertures respectively, each of said gates being substantially the width of said edge wall adjacent which it is positioned, and means for restricting each of said films to one half of each of said gates respectively, whereby said first film may be positioned upon first side wall and said member embodying said first side wall after said septum has been assembled therewith may be disposed in operative relation to said other member, said first film being maintained in position by said septum and said septum after such assembly separating said first and second films.

6. In an interchangeable film magazine for successive use in a plurality of different film handling apparatus, said magazine having an outer protective container, said container having a cover member and a body member, said body member including a side wall which when said body member and said cover member are in assembled relation to each other is held in spaced parallelism to a side wall of said cover member by edge walls, said cover member being provided with a side wall corresponding to that of said body member, a delivery support and a take-up support for a first film, said supports being disposed upon said body member for rotation upon axes normal thereto and being bodily movable therewith, a delivery support and a take-up support for a second film, said last mentioned supports being mounted upon said side wall of said cover member for rotation upon axes normal thereto and being bodily movable therewith, and a retainer movably disposable upon one of said members adjacent the edge of one of said films for holding it in position while the member with which it is bodily movable is being assembled with the other member of said container, whereby said first film may be mounted upon said body member while it is separate from said cover member and said second film mounted upon said cover member and thereafter said members joined to complete said magazine.

7. In an interchangeable film magazine for successive use in a plurality of different film handling apparatus, said magazine having an outer protective container, said container including a body member and a cover member, said body member having a flat side wall and edge walls rising therefrom at a right angle thereto and said cover member having a flat side wall and a flange adapted to co-act with said edge walls of said body member to complete the container, a delivery support and a take-up support for a first film, said supports being mounted upon said side wall of said body member for rotation upon axes normal thereto, a delivery support and a take-up support for a second film, said supports being mounted upon said side wall of said cover member for rotation upon axes normal thereto, the width of each of said films being less than half of the width of said edge walls whereby when said cover member and said body member are assembled to form a complete container said films are mounted in edge to edge relation, said edge walls being provided with apertures one aligned with said first film and one aligned with said second film when said magazine is assembled, and means readily attachable to the interior of said container for engaging the edges of the one of said films which has been assembled upon said container and holding it in place while said cover member and said body member are joined to assemble said container whereby one film may readily be positioned upon the body member and the other film upon the cover member and then the two members quickly joined.

8. In an interchangeable film magazine for successive use in a plurality of different film handling apparatus, said magazine being adapted for use in a film handling apparatus having a magazine-receiving compartment with an aperture and a motion transmitting connection therein disposed off center, said magazine having side walls held in spaced parallelism by edge walls, a delivery support and a take-up support for a first film, a suspension mount for each of said supports from one of said side walls for revolution upon axes normal to said side wall, said take-up support having a motion-receiving connection accessible from the outside of said side wall for contact with a motion transmitting connection of a film handling apparatus, a delivery support and a take-up support for a second film, a suspension mount for each of said supports for said second film in said side wall opposite said first mentioned edge wall for rotation upon an axis normal thereto, each of said suspension mounts including instrumentalities disposed in part upon each of said supports and in part upon the adjacent side wall by which each of said supports is bodily rotatable in respect of its adjacent side and supported thereby irrespective of the position in which said side wall is disposed, said side walls together with the film mounted upon each being separable from each other, the width of said films having a total less than the width of the edge walls of said magazine, said first and second films thereby being disposed in edge to edge relation to each other, and a motion-receiving connection for said second-mentioned take-up support accessible from the outside of said side wall from which it is suspended for contact by a motion-transmitting element of a film handling apparatus, an aperture being formed in each of said opposite edge walls, in alignment with each of said films, a removable septum disposable between the relatively adjacent edges of said films for holding one of said films in position while said separable side walls are being assembled and for separating said edges and edge-guiding a film during the feeding thereof, said septum including means whereby it is detachably connectible to said container therewithin, and means for guiding each film from its delivery support past its aperture to its take-up support, said take-up supports being anaxial whereby when said magazine is successively disposed in said compartment of said film handling apparatus with each of its apertures successively in alignment with the aperture of said compartment after side to side inversion said motion-receiving formations of said take-up supports cooperate with said motion-transmitting connection of said apparatus.

9. In a film magazine, an outer substantially rectangular container comprising side walls separable from each other and when assembled with each other held in spaced parallelism by edge walls, two of said edge walls opposite each other being apertured, a delivery support and a take-up support for a first film within said container, a delivery support and a take-up support for a second film within said container in edge to edge relation to said first film, a first gate for said first film disposed within said container adjacent one of said edge walls opposite the aperture thereof, said first film passing from said delivery support through said first gate and to said take-up support, a second gate for said second film disposed adjacent said opposite edge wall and opposite the aperture thereof, said second film passing from its delivery support through said second gate to its take-up support, and a removable septum disposable between said films while said sides are separated from each other, said septum including formations engaging the adjacent edges of each of said films for holding said films out of contact with each other after said separable side walls have been assembled with said films within said container.

10. A magazine according to claim 9, each of said gates including a compensating and guiding channel extending from said gate along the interior of the adjacent edge wall toward said delivery and take-up supports respectively for guiding the film between said supports and said gate and also compensating for the difference of character of movement between the film at its point of translation in the gate and upon said supports respectively.

11. A magazine according to claim 9, each of said gates including a compensating and guiding channel extending from said gate along the interior of the adjacent edge wall toward said delivery and take-up supports respectively for guiding the film between said supports and said gate and also compensating for the difference of character of movement between the film at its point of translation in the gate and upon said supports respectively, each of said gates being of a width substantially equal to that of said edge wall adjacent which it is disposed and said channels being of substantially half of said width and being disposed in line with the apertures in each of said side walls respectively.

12. A magazine according to claim 9, each of said gates including a compensating and guiding channel extending from said gate along the interior of the adjacent edge wall toward said delivery and take-up supports respectively for guiding the film between said supports and said gate and also compensating for the difference of character of movement between the film at its point of translation in the gate and upon said supports respectively, each of said gates being of a width substantially equal to that of said edge wall adjacent which it is disposed and said channels being of substantially half of said width and being disposed in line with the apertures of each of said side walls respectively, and edge guides for each of said films for restricting it to the half of its gate adjacent its aperture.

13. In a film magazine having side walls held in spaced parallelism by edge walls, said walls being separable from each other, an aperture being formed in opposite of each of said edge walls, one of said apertures being relatively adjacent one side wall and the other of said apertures being relatively adjacent said other side wall, a delivery support and a take-up support for a first film, a delivery support and a take-up support for a second film, said supports for said first film being mounted upon one side wall of said container and said supports for said second film being mounted upon the opposite side wall whereby said films are disposed in edge to edge relation to each other, and a plurality of guides forming a channel for each of said films for guiding it from its delivery support to its relatively adjacent aperture and to its take-up support, some of said guides being disposed upon one of said side walls and some being disposed upon the other of said side walls, said guides being mounted upon one of said members including formations engageable with one of said films mounted upon the other of said members when said walls and the films disposed upon each thereof are assembled with each other, and a removable septum disposable between the edges of said films.

14. A film magazine having an outer protective container which includes side walls held in spaced parallelism by edge walls, a delivery support and a take-up support for a first film, a delivery support and a take-up support for a second film, mounts for said supports for holding said films in edge to edge relation to each other, the width of each of said films being less than half that of said edge walls, a first gate for said first film disposed adjacent one of said edge walls and being of substantially the height thereof, said first film passing from its delivery support through said first gate to its take-up support, a second gate disposed adjacent an edge wall opposite that adjacent which said first gate is disposed and being of substantially the height of said second mentioned edge wall, said second film passing from its delivery support through said second gate to its take-up support, and guides engaging an edge of each of said films for restricting it to substantially one half of the gate provided therefor.

15. In a film magazine having a body member and a cover member which when assembled complete a protective enclosure for two films in edge to edge relation, said enclosure having two side walls held in spaced parallelism by edge walls, opposite of said edge walls having an aperture each disposed relatively adjacent one of said side walls, a delivery support and a take-up support for a first film, said supports being mounted upon one of said side walls and a film supported thereby passing the one of said apertures adjacent the side wall upon which said supports are mounted, a delivery support and a take-up support for a second film, a film passing from said delivery to said take-up support past the other of said apertures which is disposed relatively adjacent said side wall in which said second delivery support and said second take-up support are mounted, a first gate plate for said first film, a mount for said gate plate upon the inside surface of said side which supports said first film, said gate plates for said first film being disposed opposite and cooperating with one of said apertures, a second gate plate for said first film, a mount for said second gate plate upon the inside surface of the side of said magazine upon which said second film is supported, a first gate plate for said second film, a mount for said gate plate upon the inside surface of the side of said magazine in which said second film is supported, a second gate plate for said second film, said gate plates for said second film cooperating with the other of said apertures, and a mount for said second gate plate upon the inside surface of said side of said magazine upon which said first film is mounted, said mounts being so disposed that when said container is assembled each of said first and second gate plates extend from said surfaces in a direction normal thereto and parallel to each other and are disposed in operative relation to each other and to said first and second films respectively therebetween.

16. In an interchangeable film magazine for successive use in a plurality of different film handling apparatus, said magazine having side walls held in spaced parallelism by edge walls, a support for a first film suspended from one of said sidewalls, a support for a second film suspended from the other of said side walls, said supports being so arranged that said films are disposed in edge to edge relation to each other, the aggregate width of said films being less than the width of said edge walls, and a removable septum independent of said supports and said walls and having a plane body surface at right angles to the plane of the axis of rotation of said supports and parallel to said side walls for disposal after said septum has been attached to said magazine in a plane between and parallel to the planes parallel to said side walls in which the relatively adjacent edges of the film lie, said septum embodying attaching extensions from the plane of the body thereof in each direction at substantially right angles thereto and substantially parallel to and separate from said edge walls and of sufficient length to reach from said body surface to at least one of the side walls of said magazine.

17. In an interchangeable film magazine for successive use in a plurality of different film handling apparatus, said magazine having side walls held in spaced parallelism by edge walls, one of said side walls being removable from the other thereof, supports for a first film suspended by one of said side walls, supports for a second film suspended from the other of said side walls, said supports being so arranged that said films are disposed in edge to edge relation to the other when said side walls are assembled to complete the magazine, and a removable septum for separating said films, said septum embodying extensions from the plane surface of the body thereof in each direction at substantially right angles thereto and disposed adjacent the edge walls of said magazine and extending along said edge walls in each direction respectively to engage said side walls for supporting and positioning said septum within said magazine and between said films and with the plane of the body thereof parallel to said side walls and also embodying projections from said plane surface extending in each direction to engage an edge of each of said films, said edges respectively so engaged being relatively adjacent to each other for guiding each film, whereby the film supported by one of said side walls can be held in place while it is being assembled with the film supported upon the other of said side walls, said first mentioned projections holding said septum in place during and after such assembly and said second mentioned projections acting as edge guides after such assembly.

18. In an interchangeable film magazine adapted for successive use in a plurality of film handling apparatus, each of said apparatus having a magazine-receiving compartment wherein a motion-transmitting connection is disposed which is automatically coupled to a take-up support of the magazine when the magazine is placed in operative relation thereto, said magazine having side walls held in spaced parallelism by edge walls, means for suspending a first film with one of its edges adjacent one of said side walls, means for suspending a second film with one of its edges adjacent the side wall opposite said first mentioned side wall, the edges of said films not adjacent one of said side walls being relatively close to each other, and a removable septum independent of all of said walls for disposition between said relatively adjacent edges of the films, said septum having a principal plane surface of a length and breadth at least in one part substantially equal to the length and breadth of said side walls for separating said films and having substantially right angled attaching extensions from an edge thereof of a length slightly greater than that of the width of one of said films, said extensions being disposable between a side of one of said films and an adjacent edge wall and extending to and engaging said edge wall for supporting said septum within said magazine.

19. For use in a film magazine having two side walls at least one of which is removable from the other thereof, said magazine when said side walls are assembled with each other being held in spaced parallelism by edge walls, a support for a first film, a support for a second film, said supports being so arranged that said films can be disposed in edge to edge relation to each other and said films being of an aggregate width less than that of said edge walls after said such assembly; a removable septum; said septum comprising a main planar surface adapted to be disposed between said films to separate the relatively adjacent edges thereof, said surface being disposed substantially at right angles to the axes of rotation of said films, and at least one extension from said surface at substantially a right angle thereto, said extension being formed and positioned to engage and be supported by a wall of the magazine with which said removable septum is employed.

20. For use in a film magazine having two side walls at least one of which is removable from the other thereof, said magazine when said side walls are assembled with each other being held in spaced parallelism by edge walls, a support for a first film, a support for a second film, said supports being so arranged that said films can be disposed in edge to edge relation to each other and said films being of an aggregate width less than that of said edge wall after said such assembly; a removable septum; said septum comprising a main planar surface dimensioned and adapted to be disposed between said films to engage and separate the relatively adjacent edges thereof and a right angled resilient extension from said surface so disposed and dimensioned as to engage a wall of the magazine with which said removable septum is employed whereby said septum is adapted to be supported within said magazine between the edges of the films.

21. For use in a film magazine having two side walls at least one of which is removable from the other thereof, said magazine when said side walls are assembled with each other being held in spaced parallelism by edge walls, a support for a first film, a support for a second film, said supports being so arranged that said films can be disposed in edge to edge relation to each other and said films being of an aggregate width less than that of said edge wall after said such assembly; a removable septum; said septum comprising a main planar surface, said surface having edge guiding instrumentalities extending therefrom to engage and direct the edge of each of the films respectively used within said magazine and said septum also comprising a mount engageable with a wall of the magazine for removably positioning said septum within said magazine between said films.

22. For use in a film magazine having two side walls at least one of which is removable from the other thereof, said magazine when said side walls are assembled with each other being held in spaced parallelism by edge walls, a support for a first film, a support for a second film, said supports being so arranged that said films can be disposed in edge to edge relation to each other and said films being of an aggregate width less than that of said edge walls after such assembly; a removable septum; said septum being independent of all of said walls and consisting of a resilient main planar surface formed with edge guides projecting from said surface, at least one being turned at an angle to the plane of said surface to engage and guide the edge of one of said films and at least one other being turned in an opposite direction at an angle to said plane to engage and guide the edge of the other of said films, and a formation extending from said planar surface for removably mounting said septum within said magazine between said films.

23. For use in a film magazine having a body member and a cover member, said magazine when said cover member is assembled with said body member having side walls held in spaced parallelism by edge walls, a support for a first film, a support for a second film, said supports being so arranged that said films may be disposed in edge to edge relation to each other and said films being of an aggregate width less than that of said edge walls after such assembly; a removable septum for separating said films, a plane surface of at least a substantial portion of said septum being substantially equal to the inner surface of said side walls and said septum embodying means for detachably connecting said septum to one of said members in which a first film has been mounted with said plane surface adjacent the edges thereof whereby when said septum is placed in operative relation to one of said members after a film has been mounted therein said member with said film in place thereon may be assembled with said other member upon which said other film has been mounted, said septum retaining said first mentioned film in position during such assembly.

24. For use in a film magazine having a body member and a cover member, said magazine when said cover member is assembled with said body member having side walls held in spaced parallelism by edge walls, a support for a first film, a support for a second film, said supports being so arranged that said films may be disposed in edge to edge relation to each other and said films being of an aggregate width less than that of said edge walls after such assembly; a removable septum for separating said films, a plane surface of at least a substantial portion of said septum being substantially equal to the inner surface of said side walls and said septum embodying right angled resilient tabs or projections extending therefrom in each direction, said tabs being so disposed that they are positioned adjacent and opposite said edge walls and are such length that they extend from said septum to said side walls whereby when said septum is placed in operative relation to one of said members after a film has been mounted therein said member with said film in place thereon may be assembled with said other member upon which said other film has been mounted, said septum retaining said first mentioned film in position during such assembly.

25. In an interchangeable film magazine for successive use in a plurality of different film handling apparatus, said magazine having side walls held in spaced parallelism by edge walls, means for suspending two films in edge to edge relation to each other within the magazine, one of said films being suspended from one of said side walls and the other of said films being suspended from the other of said side walls, said films thereby being disposed in edge to edge relation to each other, each of said suspending means including a mount for a delivery support and a mount for a take-up support between which the film extends, each of said mounts being disposed upon the inside surface of its respective side wall whereby each of said supports is rotatable in respect to its adjacent side wall and supported thereby irrespective of the position in which said side wall is disposed and bodily movable therewith, said side walls and the films respectively suspended therefrom being separable one from the other, opposite of said edge walls of said magazine being supplied with apertures each in alignment with one of said films, guides for directing each of said films from its delivery support past its aperture and to its take-up support, and a member removably attachable to one of said side walls while it is separated from the other thereof and disposed adjacent the edge of the film which has been assembled therewith for holding said film in operative relation thereto while said side wall is being assembled with the other of said side walls.

26. A film magazine having a body member and a cover member which when assembled form a complete container having side walls and edge walls, a first delivery support and a first take-up support for a first film mounted upon said body member therewithin, said first film passing between said supports past an aperture in an edge wall of said container, whereby said first film may be positioned upon said body member as said body member lies flat upon a support, a second delivery support and a second take-up support mounted on said cover member therewithin, said second film extending between said second support past a second aperture in an edge wall of said container, whereby said second film may be positioned upon said cover member independently of said body member as cover member lies flat upon a support, and means for holding the stretch of one of said films in position between its supports after both films have been separately positioned within said members respectively while one of said members is bodily moved to assemble it with the other thereof.

27. A film magazine having a body member and a cover member which when assembled form a complete container having side walls and edge walls, a first delivery support and a first take-up support for a first film mounted upon said body member therewithin, whereby said first film may be positioned upon said body member as said body member lies flat upon a support, said first film passing between said supports past an aperture in an edge wall of said body member after said members have been assembled, a second delivery support and a second take-up support mounted on said cover member therewithin, whereby said second film may be positioned upon said cover member as it lies flat upon a support, the support for said second film being so disposed that after said cover and said body member have been assembled to form said container said second film extends between said second support past a second aperture separate from said first aperture in an edge wall of said body member, and means attachable to one of said members for holding the stretch of said film disposed therefrom in position between said supports after both films have been separately positioned within said members respectively while one of said members is bodily moved to assemble it with the other thereof.

28. A film magazine having a body member and a cover member which when assembled form a complete container having side walls and edge walls, a first delivery support and a first take-up support for a first film mounted upon a side wall of said body member, a second delivery support and a second take-up support mounted upon a side wall of said cover member, said edge walls of said body member being of a height of the order of that of the combined width of said first and second films, the films thus being adapted to be arranged in edge to edge relation to each other in said container, a first aperture in one of the edge walls of said body member for said first film, a second aperture for the second of said films in an edge wall of said body member, said apertures being of a size to expose one of said films and being spaced from each other, a first gate for said first aperture, said gate being of substantially the height of said combined widths of said films, said first film being adapted to be fed through the half of said gate relatively adjacent the side wall of said body member as it passes between said supports, a second gate for said second film for said second aperture, said second gate being of a height of the order of the combined widths of said first and second films, said second film being adapted to pass through the half of said second gate relatively adjacent the said wall of said cover member, and a holding and separating plate adapted to be removably mounted upon one of said members and having formations engaging the adjacent edges of said films for holding one of said films in position within its member while the other of said members with its films mounted therewithin is assembled therewith and also for restricting each film to its operative half of its gate.

29. A film magazine having a body member and a cover member which when assembled form a complete container having side walls and edge walls, a first delivery support and a first take-up support for a first film mounted upon a side wall of said body member, a second delivery support and a second take-up support mounted upon a side wall of said cover member, said edge walls of said body member being of a height of the order of that of the combined width of said first and second films, the films thus being adapted to be arranged in edge to edge relation to each other in said container, a first aperture in one of the edge walls of said body member for said first film, a second aperture for the second of said films in an edge wall of said body member, said apertures being of a size to expose one of said films and being spaced from each other, a first gate member for holding said first film in position opposite said first aperture, said first gate member being of substantially the height of the combined widths of said films, said first film being adapted to be fed past the first half of said gate relatively adjacent the side wall of said body member as it passes between said supports, said first gate member being mounted upon said body member whereby said first film may be positioned therein while said body member and said cover member are separated, a second gate member for holding said second film in position opposite said second aperture, said second gate member being of a height of the order of the combined widths of said first and second films, said second film being adapted to pass through the half of said second gate member relatively adjacent the side wall of said cover member, said second gate member being mounted upon said cover member whereby said second film may be positioned therein while said cover member and said body member are separated, and a holding and separating plate adapted to be removably mounted upon one of said members and having formations engaging the adjacent edges of said films for holding one of said films in position within its members while the other of said members with its film mounted therewithin is assembled therewith and also for restricting each film to its operative half of its gate member during a feeding operation.

30. In a film magazine, a body member and a cover member, a first delivery support and a first take-up support for a first film mounted within said body member, said first film extending between said first supports and past a first aperture therebetween, a second delivery support and a second take-up support for a second film mounted upon the inside surface of said cover member, said second film extending between said second supports and past a second aperture therebetween, a first two-part gate for said first film, said gate including one member mounted upon said body member wherein before said cover and body members have been assembled said first film may be placed as it is positioned within said body member for holding it loosely in approximate position for feeding past said first aperture after such assembly, a second two-part gate for said second film, said second gate including one member mounted upon said cover member wherein before said cover and body members have been assembled said second film may be placed as it is positioned on said cover for holding it in approximate position for feeding past said second aperture after such assembly, said first gate including a second member mounted upon said cover member and said second gate including a second member mounted upon said body member, said gate members including cooperating instrumentalities whereby when said cover member and said body member are assembled with the first and second films therein each of said films is pressed against its aperture.

31. An interchangeable film magazine adapted for successive use in a plurality of film handling apparatus; each of said apparatus having a magazine receiving compartment wherein a motion-transmitting connection is disposed which is automatically coupled to a take-up support of the magazine when the magazine is placed in said compartment and in operative relation to said connection, said connection being off center; said magazine having a cover member and a body member separable therefrom, said members having cooperating formations by which they may be joined to each other to form the container of said magazine, a first film being disposable in said body member and a second film being disposable in said cover member while said members are separated and disposed flat upon a support, a removable septum independent of the walls of said cover member and said body member and disposable upon one of said members for holding the film disposed therein in place while said member is inverted and being joined to said other member, said magazine having a delivery support for a first film mounted in said cover member and bodily movable therewith and rotationally movable thereupon, a delivery support for a second film mounted in said body member and bodily movable therewith and rotationally movable thereupon, a take-up support for said first film mounted in said cover member and rotationally movable thereuopn and bodily movable therewith, and a take-up support for said second film mounted in said body member for rotation thereupon and bodily movable therewith, said delivery supports being arranged with the film separated thereby in edge to edge relation to each other and being coaxial, said take-up supports being arranged in edge to edge relation to each other and being anaxial, said septum being disposed between the adjacent edges of said films separating said films after it has been attached to said member as aforesaid, said septum and said supports being independent of each other, each of said take-up supports embodying a motion-receiving connection extending through the adjacent wall of said magazine for engagement with and operation by motion-transmitting connections of said apparatus when said magazine is successively placed in contact with various of said apparatus, one of said take-up supports and then the other thereof being placed in such relationship following the inversion of the magazine.

32. In an interchangeable film magazine for successive use in a plurality of different film handling apparatus, said magazine having a cover member and a body member which when assembled form a protective enclosure for two films disposed therein in edge to edge relation, said members having formations which when they are joined hold them in assembled relation, said body member having a side wall and edge walls, said edge walls of said body member having two apertures, one of said apertures being disposed relatively adjacent said side wall and the other of said apertures being disposed relatively distant from said side wall, a delivery support and a take-up support for a first film, said supports being mounted upon said side wall of said body member and said first film supported thereby passing one of said apertures, a delivery support and a take-up support for a second film, said supports being mounted upon the side wall of said cover member and said second film when said cover member is mounted upon said body member passing from said delivery to said take-up support past the other of said apertures, a first presser plate for said first film, said presser plate being mounted upon the inside surface of said side wall of said body member and being disposed opposite one of said apertures for holding said first film in operative relation thereto after said cover member and said body member have been assembled, a second presser plate for said second film, said second presser plate being mounted upon said side wall of said cover member and disposed opposite the other of said apertures for holding said second film in operative relation thereto, whereby each of said films may be positioned upon its member while said members are separated, and guiding formations for holding one of said films upon the member upon which it has been positioned while said member is being joined to said other member, said formations cooperating with each of said presser members to direct each of the films through its own exposure path after said members have been joined.

33. In a film magazine, said magazine comprising a container with outer walls, at least one of said outer walls being removable from the container, rotatable supports for a first film mounted in one of said outer walls, rotatable supports for a second film mounted in another one of outer walls opposite said last mentioned outer wall, said supports being so arranged upon said walls that said films are disposed in edge to edge relation to each other, a removable septum, means for detachably connecting said septum to the interior of said magazine between the relatively adjacent edges of said films, said septum embodying a principal plane surface which when said septum is attached to said magazine while only said first film is supported thereby is disposed adjacent the edge thereof relatively distant from the outer wall in which it is supported thereby holding said first film in place and when said second film has been placed in position and said container is ready for use is disposed between the adjacent edges of said films, said septum also embodying projections from said plane surface at least one of which extends in one direction away from said surface and is effective to engage the edge of one of said films for guiding it and at least one other of said projections extends in the other direction away from said principal plane surface and is effective to engage the relatively adjacent edge of the other film for guiding it.

34. In an interchangeable film magazine for successive use in a plurality of different film handling apparatus, said magazine having side walls held in spaced parallelism by edge walls, at least one of said side walls being detachable, a support for a first film mounted in one of said side walls, a support for a second film mounted in the other of said side walls, said supports being so arranged that said films are disposed in edge to edge relation to each other, and a removable septum independent of and readily separable from all of said walls for holding said films in position during the assembly of said magazine and separating said films after such assembly, said septum embodying resilient attaching formations for detachably supporting it within said magazine by resilient contact with at least one of the edge walls thereof, said septum when so attached being disposed between the relatively adjacent edges of said films.

35. In a film magazine having side walls held in spaced paralellism by edge walls, supports for a first film mounted upon one of said side walls, supports for a second film mounted upon the other of said side walls in edge to edge relation to said first film, said walls forming a complete enclosure for said films, and a septum independent of all of said walls and removable therefrom and disposable in a position adjacent and between the relatively adjacent edges of each of said films in a plane parallel to said side walls, said septum consisting of a guiding formation and attaching instrumentalities, said attaching instrumentalities being removably engageable with the interior of walls of said magazine for removably holding said septum in said position adjacent the edge of said first film after it has been placed upon its supports, said edge being the one relatively distant from the side walls from which said supports are suspended, and said guiding formation after said septum has been disposed in said position being effective to hold said first film in place during the assembly of said second film upon its supports and after such assembly being effective to separate relatively adjacent edges of said films.

References Cited in the file of this patent

UNITED STATES PATENTS

| Number | Name | Date |
|---|---|---|
| 1,730,930 | Fritts | Oct. 8, 1929 |
| 1,935,210 | Hopkins | Nov. 14, 1933 |
| 2,123,495 | Becker | July 12, 1938 |
| 2,143,769 | Fairbanks | Jan. 10, 1939 |
| 2,175,538 | Morsbach et al. | Oct. 10, 1939 |
| 2,372,637 | Williamson et al. | Mar. 27, 1945 |
| 2,431,254 | Jacobson | Nov. 18, 1947 |
| 2,568,339 | Jacobson | Sept. 18, 1951 |

FOREIGN PATENTS

| Number | Country | Date |
|---|---|---|
| 479,379 | Great Britain | Feb. 4, 1938 |
| 489,658 | Great Britain | Aug. 2, 1938 |